July 12, 1960
J. M. TYLER
2,944,392
HOLLOW VANE EXHAUST SILENCER EFFECTING THRUST GENERATION
Filed March 29, 1956
3 Sheets-Sheet 1
FIG_1
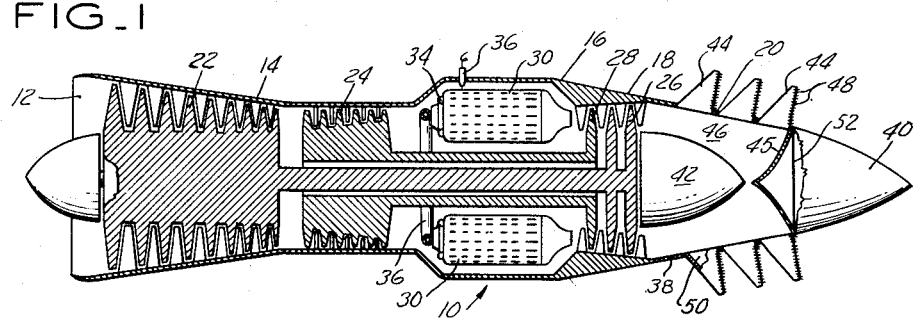
FIG_2
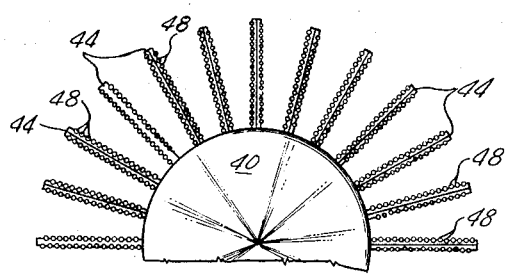
FIG_12
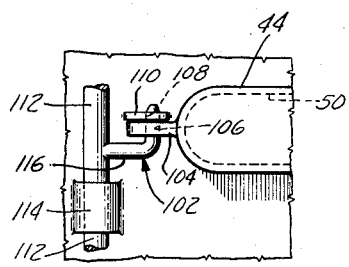
FIG_13
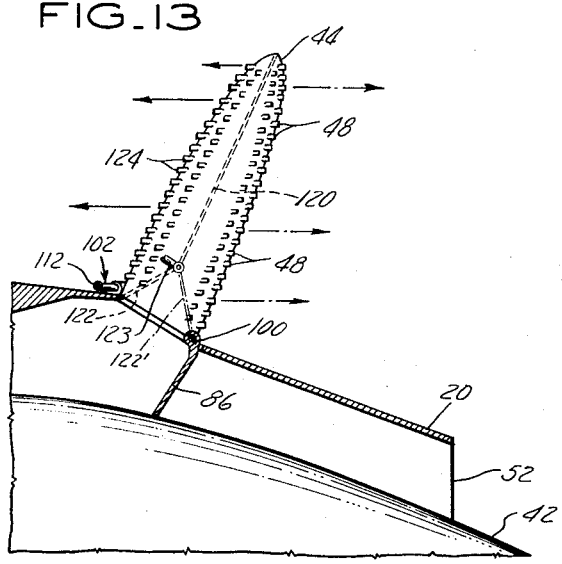
INVENTOR
JOHN M. TYLER
BY  Vernon F. Hauschild
ATTORNEY July 12, 1960  J. M. TYLER  2,944,392
HOLLOW VANE EXHAUST SILENCER EFFECTING THRUST GENERATION
Filed March 29, 1956  3 Sheets-Sheet 2
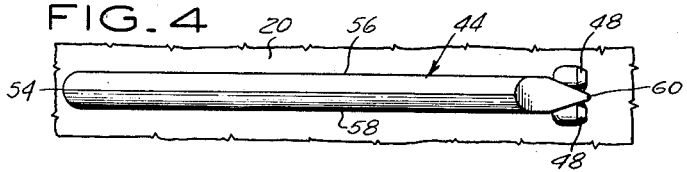
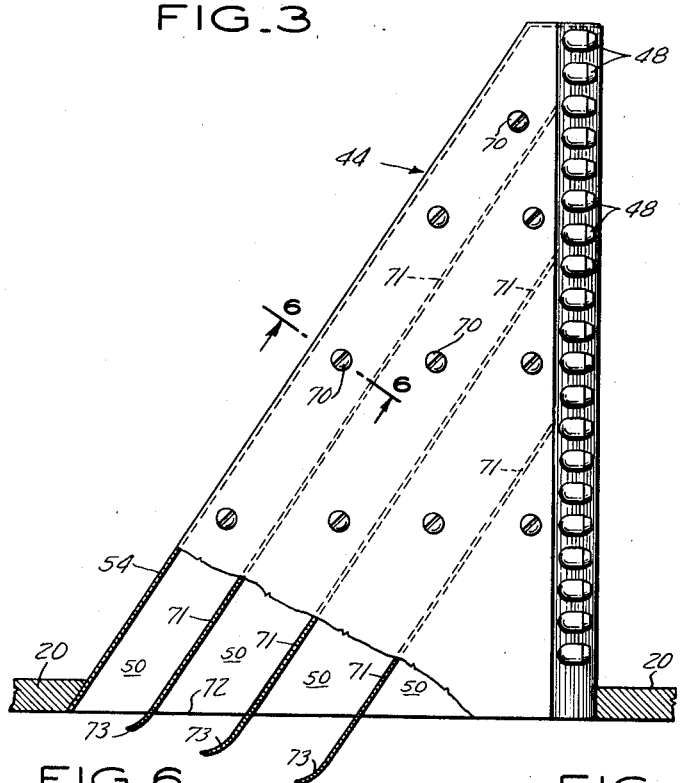
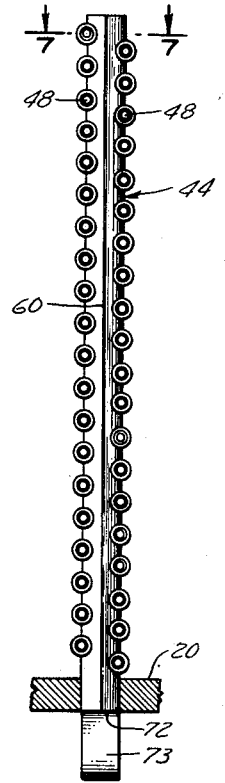
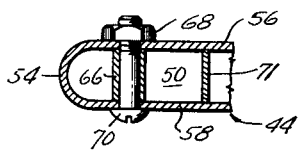
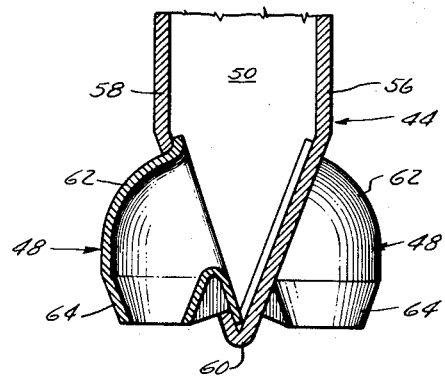
INVENTOR
JOHN M. TYLER
BY Vernon F. Hauschild
ATTORNEY July 12, 1960 J. M. TYLER 2,944,392
HOLLOW VANE EXHAUST SILENCER EFFECTING THRUST GENERATION
Filed March 29, 1956 3 Sheets-Sheet 3
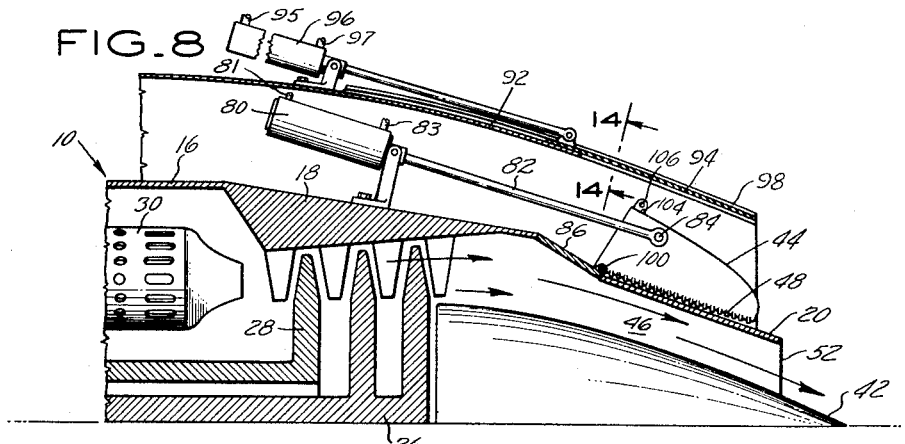
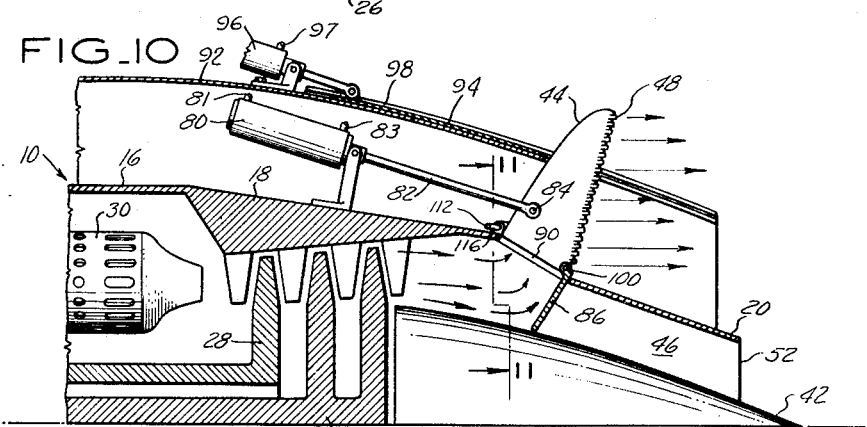
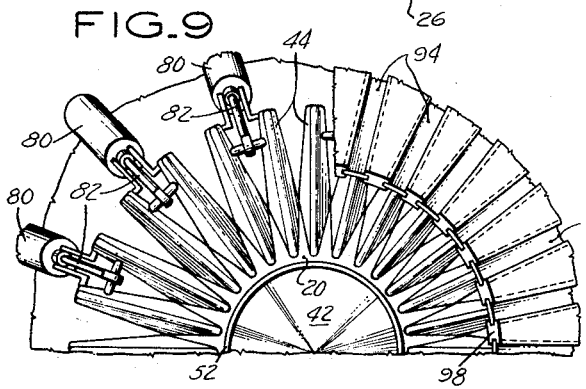
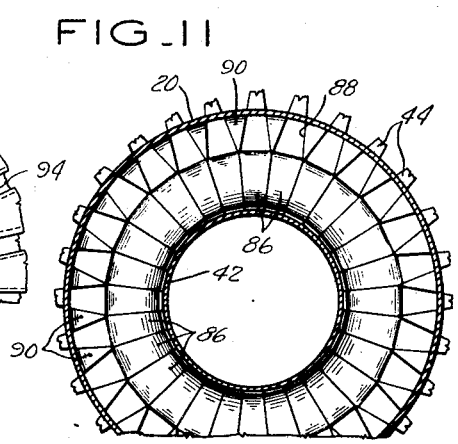
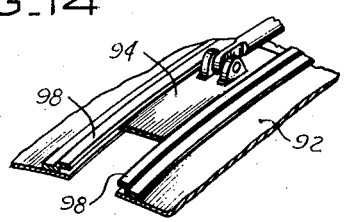
INVENTOR
JOHN M. TYLER
BY Vernon D. Hauschild
ATTORNEY

United States Patent Office 2,944,392
Patented July 12, 1960

2,944,392
HOLLOW VANE EXHAUST SILENCER EFFECTING THRUST GENERATION

John M. Tyler, Glastonbury, Conn., assignor to United Aircraft Corporation, East Hartford, Conn., a corporation of Delaware Filed Mar. 29, 1956, Ser. No. 574,884

9 Claims. (Cl. 60—35.6)

This invention relates to noise abatement means and more particularly to the suppression or reduction of jet engine exhaust noises.

With the advent of the jet engine and its use in modern military and commercial aircraft the problem of abating the noises created by the exhaust of the jet engine arises. The problem becomes particularly pertinent now that jet engines are intended for commercial use. The suppression of jet engine noises is of importance not only for passenger comfort but also to prevent nuisance to persons living near airports and hazards to personnel working in the vicinity of airstrips.

It is an object of this invention to provide noise suppression means for the exhaust of jet engines by causing the jet engine to exhaust through a large number of small nozzles producing noise at higher frequency than occurs when exhausting through the normal single jet nozzle.

It is a further object of the present invention to provide noise abatement means in the form of a hollow radial vane which vane is in communication with the tail pipe of the jet engine and which vane has a plurality of small nozzles or holes on or near its trailing edge through which the jet gases are exhausted in a thrust generating function to permit ground handling and flight silencing.

It is still a further object of the present invention to provide noise abatement means for use on jet engines in the form of hollow radial vanes which may be retracted so that the normal single exhaust outlet is used and which may be brought into an operating position in which position the normal single exhaust outlet is blocked off and the entire engine gas volume must be exhausted through the plurality of small jets on the downstream side of the radial vanes.

It is still a further object of the present invention to provide retractable hollow radial vanes on the tail pipe of a jet engine having a plurality of small nozzles projecting therefrom and so directed and used in combination with appropriate valving so that the exhaust gas may be passed through the vane and out the small nozzles to effect noise abatement and thrust reversal.

Referring to the drawings, we see that:

Fig. 1 is a cross sectional view of a turbojet engine having exhaust silencers of the type taught in this invention.

Fig. 2 is a rear view of the configuration shown in Fig. 1.

Fig. 3 is a side view of a silencer vane or fin so taught in this invention.

Fig. 4 is a top view of the silencer vane shown in Fig. 3.

Fig. 5 is a rear view of the silencer vane shown in Fig. 3.

Fig. 6 is a view taken along line 6—6 of Fig. 3.

Fig. 7 is a view taken along line 7—7 of Fig. 5.

Fig. 8 is a retractable vane embodiment of my silencer shown in its retracted position.

Fig. 9 is a rear view of the embodiment shown in Fig. 8 with the cowl removed in part thereof.

Fig. 10 is the retractable vane embodiment shown in Figs. 8 and 9, but here shown in its operating position.

Fig. 11 is a view taken along line 11—11 of Fig. 10.

Fig. 12 is a partial enlargement of a silencer vane locking mechanism of the type used in my retractable vane embodiment invention.

Fig. 13 is a variation of my invention showing a retractable vane embodiment having both exhaust silencer and thrust reversal features.

Fig. 14 is a perspective view substantially along line 14—14 of Fig. 8.

Referring to Fig. 1, we see aircraft gas turbine or jet engine 10. Engine 10 consists of air inlet section 12, compressor section 14, combustion chamber section 16, turbine section 18, and exhaust section 20. The compressor section 14 consists of both low pressure compressor 22 and high pressure compressor 24, which are attached to the last turbine stages 26 and the first turbine stage 28, respectively, in spool fashion. Combustion chambers 30 are located within combustion section 16 and are fed fuel through fuel manifold 36 and fuel nozzle 34. Fuel is supplied to fuel manifold 36 from any source such as a fuel pump (not shown). Spark plug or other ignition means 32 is used to ignite the fuel which enters combustion chamber 30. Exhaust section 20 consists of tail pipe 38, rear cover or cone 40, central cone 42, and a plurality of hollow radial vanes 44 which are in communication with chamber 46, the exhaust section interior, and which have a plurality of small nozzles 48 on their trailing edge, which nozzles are in communication with the central hollow opening 50 of vane. While Fig. 1 shows three banks or rows of silencer vanes or fins 44, any number could be used so long as sufficient total exhaust area is offered so that the total flow characteristics through the plurality of holes or nozzles 48 is substantially the same as through normal exhaust outlet 52 so as not to adversely affect the total engine thrust generation during silencing to permit flight use of my silencer. Conical bulkhead 45 diverts fluid flow into hollow vanes 44. Rear cover 40 is conical in shape to reduce base drag.

Air enters powerplant 10 through air inlet 12 and is compressed as it passes through compressor section 14. The compressed air is then heated as it passes through combustion section 16. The heated gas then passes through turbine section 18, which turbine extracts sufficient energy from the gas to drive compressors 22 and 24. After passing through turbine section 18, the exhaust gas is prevented from being exhausted through its normal single exhaust outlet 52 by means of rear cover 40; therefore, the exhaust gases must pass through the plurality of hollow radial fins or vanes 44 and be discharged through the plurality of small nozzles 48 which are in communication with the center of vane 44 and which direct the exhaust gas downstream in a thrust generating function. The theory of noise suppression lies in shifting the noise energy from low frequency as would be produced by exhausting through a normal single large jet outlet 52, to high frequency as would be produced by exhausting through the plurality of small nozzles or holes 48. There are a sufficient number of small nozzles 48 chosen that the total exhaust area presented by the plurality of exhaust nozzles 48 will flow the same amount of exhaust gas as the normal exhaust outlet 52.

Referring to Fig. 2, we see a rear view of the engine showing the plurality of small nozzles or holes 48 located in radial extending hollow vanes 44. As stated above, the number and size of exhaust nozzles 48 are chosen so as to allow the flow of the desired amount of exhaust gas and hollow radial vanes 44 are chosen so as to have larger passages for flow than the nozzles so as to minimize internal flow losses.

Now referring to Figs. 3, 4, 5, 6, and 7, we obtain a better understanding of the construction of radial vanes 44. Vane 44, while not necessarily so limited, may be made of sheet metal consisting of forward wall 54, side portions 56 and 58, and rear wall 60, which rear wall 60 is tapered in cross section as best shown in Fig. 7. Again referring to Fig. 7, we see that nozzles 48 project from and are probably welded or brazed to side portions 56 and 58 of hollow radial vane 44. Nozzle 48 consists of nozzle passage 62 and nozzle outlet 64. The side portions 56 and 58 of hollow vane 44 are supported in space relation by spacers 66 and any clamping or attachment means such as nut 68 and bolt 70. It will be noted that vane 44 is hollow and is in free aerodynamic communication, thru its base opening 72, with exhaust duct interior 46 (Fig. 1) and that nozzles or holes 48 are in free communication with the interior of hollow vane 44. Due to this construction, the exhaust gases may pass freely from the interior of exhaust duct 20, thru hollow vanes 44 and be exhausted thru nozzles or holes 48.

As best shown in Fig. 3, compartment bulkheads 71 may be used both to stiffen, space and support hollow vane 44 to prevent side walls 56 and 58 from separating under gas pressure and to guide volumes of gas or fluid to insure that all nozzles 48 are substantially proportionately utilized. Turning vanes 73 may be used to direct fluid flow into vane 44.

Now referring to Fig. 8, we see an embodiment of my invention in which hollow vane or fin 44 is moveable. As shown in Fig. 8, vane 44 is in its retracted position, while in Fig. 10, vane 44 is in its operative position. Hydraulic or air-actuated cylinder 80 actuates vane driving rod 82. Actuating rod 82 is pivotally attached to vane 44 through pin or joint 84. It will be noted in this embodiment that in addition to the plurality of small exhaust nozzles or openings 48 which are rearwardly directed when vane 44, is in its operative position, vane 44 also carries a flap unit 86, which flap 86 performs the double function of blocking off the normal exhaust gas flow as shown in Figs. 10 and 11, and also of blocking holes 88 which are located in the outer periphery of exhaust duct 20 and which are separated by metallic pieces or segments 90.

As shown in Fig. 8, gas from combustion section 16 passes through turbines 28 and 26 and thence through the volume formed by exhaust duct 20 and inner cone 42. Vane 44 is in its retracted position and sits within cowl 92. It will be noticed that moveable cowl flaps 94 are used to cover vanes 44 when the vanes are retracted and are sandwiched in slidable fashion between opposed jaws 98 of cowl 92. Cowl flaps 94 are moved by actuating cylinder 96, as compressed fluid is introduced to one side of the piston (not shown) therein thru either conduit 95 or 97 from any pressure source (not shown). The same operation applies to the operation of actuating cylinder 80, as compressed fluid enters either line 81 or 83.

With vane 44 in its retracted position, Fig. 8, flap 86 serves to close hole 88 which is formed in the outer periphery of exhaust duct 20 between metallic segments 90 of exhaust duct 20. As shown in Fig. 8, engine 10 is operating in the conventional jet engine fashion. The entire jet exhaust is being discharged through exhaust outlet 52.

Referring to Fig. 9, we see a rear view of the embodiment shown in Fig. 8 with the hollow vane silencers 44 in their retracted position. In a portion of Fig. 9 cowl 92 and slidable flaps 94 are not shown so that the nested retracted silencing vanes may be shown. In another section of Fig. 9 the cowl is shown so that slidable flap unit 94 is shown to slide within opposed jaws 98 of adjacent cowl segments. Movable cowl flaps 94 need be of only such length that it will move forward uncovering vane 44 so that it can be pivoted outwardly into its operating position. Vane 44 pivots about pivot point 100.

Now referring to Fig. 10, we see this same embodiment with vanes 44 in their operative position. It will be noted that actuating unit 80 has caused actuating rod 82 to rotate hollow vane 44 about pivot point 100 such that it is in a radially outward extending position and such that flap 86 moves in against central exhaust cone 42 to block off the normal flow of jet exhaust outlet 52, thereby forcing it, due to the angularity of flap 86, to move out through the plurality of hollow flaps 44 and be discharged through the plurality of small rearwardly directed exhaust nozzles 48. It will be noted that the movable cowl flap 94 is now in its forward position, due to the actuation of cylinder 96. It will further be noted that both cylinders 80 and 96 are pivotable to permit them to accommodate the radial movement of vanes 44 and flap segments 94, respectively.

In Fig. 11, it will be seen that the plurality of flaps 86 abut one another so as to block off exhaust passage 46 when vanes 44 are in their outward or operative position and that this leaves open holes 88, through which the gases from the engine 10 must pass to enter vanes 44 and thence to flow or be discharged through rearwardly directed exhaust nozzles 48.

It will be noted that locking unit 102 is used to lock vane 44 in its operative position. This mechanism for locking the vane is shown in greater detail in Fig. 12.

Referring to Fig. 12, we see that lug 104 projects forward of vane 44 and has a hole 106 therein which aligns with hole 108 of lug 110 which is attached to exhaust duct 20. Ring 112 rotates thru a plurality of circumferentially spaced bosses 114 and carries locking arm 116, which locking arm projects through holes 106 and 108 of bosses 104 and 110 respectively so as to lock vane 44 in its radially outward operative position. Ring 112 may be caused to operate by any convenient pilot operated lever (not shown).

Referring to Fig. 13, we see an additional embodiment which accomplishes thrust reversal with noise suppression. When vane 44 with its central partition 120 is in its operative position, as shown, and when flapper valve 122 is in the position shown, the exhaust gas will pass out the rearwardly directed exhaust silencing jets 48. When used in this fashion, vane 44 accomplishes a jet noise reducing function. If flapper valve 122 is caused to move to its rearward position shown in phantom by 122', which movement is caused by crank unit 123, the jet exhaust gases then flow out forwardly directed jets 124 to perform a thrust reversal and jet noise reducing function. The hollow vane embodiment, shown in Fig. 13, may be actuated, and covered by a cowl in the same fashion as described supra relative to the embodiment shown in Figs. 8 and 9.

It is to be understood that the invention is not limited to the specific embodiment herein illustrated and described, but may be used in other ways without departure from its spirit as defined by the following claims.

I claim:

1. A jet engine located within a cowl and having a compressor, a turbine, a combustion section separating said compressor and said turbine, an exhaust duct adjacent to said turbine having an exhaust outlet and further having a plurality of openings in the outer periphery thereof, a hollow vane pivotally attached to each of said exhaust duct openings, means to pivot said vane such that it is either in a substantially radially outwardly extending operative position or in a retracted non-operative position with said vane juxtapositioned to the outer periphery of said exhaust duct, a plurality of rearwardly extending nozzles in the wall of said hollow vane, such that the total area of said nozzles will facilitate substantially equal exhaust gas flow to the exhaust gas flow through said exhaust outlet, means to block said exhaust duct so that gas may not pass through said exhaust outlet when said vane is in said operative position and so that all gas must pass through said nozzles, means to block said exhaust duct openings when said vane is in said retracted, non-operative position so that all gas must pass through said exhaust outlet, and retractable cowl means adapted to cover said vane when in its retracted position and further adapted to retract to permit said vane to pivot into its operative position.

2. A jet engine having a compressor, a turbine, a combustion section separating said compressor and said turbine, an exhaust duct adjacent to said turbine having an exhaust outlet and further having a plurality of openings in the outer periphery thereof, a hollow vane pivotally attached to each of said exhaust duct openings and having a plurality of nozzles in both the front edge and rear edge thereof, means to pivot said vane such that it is either in a substantially radially outwardly extending operative position or in a retracted non-operative position in which vane position said front edge nozzles are forwardly directed and said rear edge nozzles are rearwardly directed with said vane juxtapositioned to the outer periphery of said exhaust duct, means to block said exhaust duct so that gas may not pass through said exhaust outlet when said vane is in said operative position and so that all gas must pass thru said nozzles, means to block said exhaust duct openings when said vane is in said retracted, non-operative position so that all gas must pass thru said exhaust outlet, valve means adapted to direct gas flow either thru said forwardly directed nozzles to produce both exhaust noise silencing and thrust reversal or thru said rearwardly directed nozzles to produce normal thrust and exhaust noise silencing, said exhaust duct, said exhaust outlet, said hollow vanes and said rear edge nozzles each being of a total area, such that the total flow characteristics thru said exhaust outlet during vane retracted position operation is substantially the same as thru said rear edge nozzles during vane extended position operation when said vane is in said operative position.

3. An exhaust silencer having an exhaust duct with an exhaust outlet and further having at least one opening in the outer periphery thereof, a hollow vane pivotally attached to said opening such that it is either in a substantially radially outwardly extending operative position or in a retracted non-operative position with said vane juxtapositioned to the outer periphery of said exhaust duct, a plurality of rearwardly extending nozzles in the wall of said hollow vane, means to block said exhaust duct so that gas may not pass through said exhaust outlet when said vane is in said operative position so that all gas must pass through said nozzles, and means to block said exhaust duct openings when said vane is in said retracted, non-operative position so that all gas must pass through said exhaust outlet.

4. A thrust generating exhaust silencer comprising an exhaust duct having an exhaust outlet at the downstream end thereof and further having a plurality of openings in the outer periphery thereof, a plurality of hollow vanes each pivotally attached to one of said exhaust duct openings, means to pivot said vanes such that they are either in a substantially radially outwardly extending operative position or in a retracted non-operative position with said vanes juxtapositioned to the outer periphery of said exhaust duct, a plurality of nozzles in the wall of each of said hollow vanes which are rearwardly extending when said vanes are in their operative position, the total area of said nozzles being selected to facilitate substantially equal exhaust gas flow thru said nozzles during vane operative position operation to the exhaust gas flow through said exhaust outlet during vane retracted position operation, means to block said exhaust duct openings when said vanes are in said retracted, nonoperative position so that all gas must pass through said exhaust outlet to generate normal thrust propulsion, and means to block said exhaust duct so that gas may not pass through said exhaust outlet when said vanes are in said operative position and so that all gas must pass through said nozzles thereby silencing exhaust noises without thrust generation reduction.

5. Apparatus to silence jet exhaust and produce either normal or reverse thrust comprising an exhaust duct having an exhaust outlet and further having a plurality of openings in the outer periphery thereof, a hollow vane pivotally attached to each of said exhaust duct openings and having a plurality of nozzles in both the front edge and rear edge thereof, means to pivot said vane such that it is either in a substantially radially outwardly extending operative position in which vane position said front edge nozzles are forwardly directed and said rear edge nozzles are rearwardly directed or in a retracted nonoperative position with said vane juxtapositioned to the outer periphery of said exhaust duct, means to block said exhaust duct so that gas may not pass thru said exhaust outlet when said vane is in said operative position and so that all gas must pass thru said nozzles, means to block said exhaust duct openings when said vane is in said retracted, nonoperative position so that all gas must pass thru said exhaust outlet, valve means adapted to direct gas flow either thru said forwardly directed nozzles to produce both exhaust noise silencing and thrust reversal or thru said rearwardly directed nozzles to produce normal thrust with exhaust noise silencing, said exhaust duct, said exhaust outlet, said hollow vanes and said rear edge nozzles each being of a total area such that the total flow characteristics thru said exhaust outlet during vane retracted position operation is substantially the same as thru said rear edge nozzles during vane extended position operation when said vane is in said operative position.

6. A thrust generating exhaust silencer comprising an exhaust duct having an exhaust outlet at the downstream end thereof, a tail cone concentrically located within said exhaust duct to form an exhaust gas passage therebetween, a plurality of hollow vanes each pivotally attached to the periphery of said exhaust passage, means to pivot said vanes such that they are either in a substantially radially outwardly extending operative position or in a retracted nonoperative position, a plurality of nozzles in the wall of said hollow vanes which are rearwardly extending when said vanes are in their operative position, the total area of said nozzles selected to facilitate substantially equal exhaust gas flow through said nozzles during vane operative position or silencing operation to the exhaust gas flow through said exhaust outlet during vane retracted position or non-silencing operation, means to block said exhaust duct so that gas may not be discharged between said exhaust outlet and tail cone when said vanes are in said operative position and so that all gas must pass through said nozzles thereby silencing exhaust noises without thrust generation reduction, and means to block admission to said vanes when said vanes are in said retracted, nonoperative position so that all gas must be discharged thru said gas passage formed between said exhaust duct outlet and said tail cone.

7. Thrust generating means to control the frequency of the noise to be created in the turbulent exhaust gas wake of a jet engine caused by discharging to atmosphere a high velocity stream of nonpulsating, heated and pressurized exhaust gas which is substantially free of low frequency sound waves, comprising an exhaust duct having an axis and further having an inlet adapted to receive all of the exhaust gas stream before exhaust gas mixing with atmosphere occurs, at least one hollow vane projecting radially outward from said exhaust duct and in aerodynamic communication therewith, said vane having a convergently tapering rear wall with a plurality of axially directed, separated and spaced small contoured thrust nozzles projecting therefrom through which exhaust gas from said exhaust duct may pass, said inlet and said nozzles constituting the sole apertures in said exhaust duct and vane so that all exhaust gas passes into said exhaust duct through said inlet and thence into said vane and then from said vane directly to atmosphere through said nozzles as separate and spaced, high frequency, thrust generating jet wakes.

8. Thrust generating means to control the frequency of the noise to be created in the turbulent exhaust gas wake of a jet engine caused by discharging to atmosphere a high velocity stream of nonpulsating, heated and pressurized exhaust gas which is substantially free of low frequency sound waves comprising an exhaust duct having an axis and further having an inlet adapted to receive all of the exhaust gas stream before exhaust gas mixing with atmosphere occurs, and still further having a plurality of holes in the outer periphery thereof, in combination with a jet exhaust silencer comprising means to block gas passage through said duct, a hollow vane projecting from each hole in said exhaust duct and in aerodynamic communication therewith, said vane having a convergently tapering rear wall with a plurality of axially directed and separate and spaced small circular contoured thrust nozzles projecting therefrom through which exhaust gas from said exhaust duct may exhaust, said openings being spaced at least three opening diameters on centers, said inlet and said nozzles constituting the sole apertures in said exhaust duct and vane so that all exhaust gas passes into said exhaust duct through said inlet and thence into said vane and then from said vane directly to atmosphere through said nozzles as separate and spaced, high frequency, thrust generating jet wakes.

9. Thrust generating means to control the frequency of the noise to be created in the turbulent exhaust gas wake of a jet engine caused by discharging to atmosphere a high velocity stream of nonpulsating, heated and pressurized exhaust gas which is substantially free of low frequency sound waves comprising an exhaust duct having an inlet adapted to receive all of the exhaust gas stream before exhaust gas mixing with atmosphere occurs and an exhaust outlet at the downstream end thereof, a plurality of hollow vanes projecting radially outward from said exhaust duct and circumferentially spaced substantially symmetrical thereabout and in aerodynamic communication therewith, said vanes each having a convergently tapering rear wall with a plurality of separate and spaced small contoured thrust nozzles projecting therefrom adapted to discharge exhaust gas passing therethrough in the same direction as the fluid in said exhaust duct is flowing, said exhaust duct, vanes and nozzles each being of such total area that the total flow characteristics through said exhaust duct and nozzles are substantially the same, said inlet and said nozzles constituting the sole apertures in said exhaust duct and vanes so that all exhaust gas passes into said exhaust duct through said inlet and thence into said vanes and then from said vanes directly to atmosphere through said nozzles as separate and spaced, high frequency, thrust generating jet wakes, means to select whether the exhaust gas passing through said exhaust duct is to be discharged through said outlet in a thrust generating function or said plurality of nozzles in both a thrust generating and jet exhaust noise suppression function.

References Cited in the file of this patent

UNITED STATES PATENTS

| | | |
|---|---|---|
| 1,401,368 | Schneebeli | Dec. 27, 1921 |
| 1,949,041 | De Lagabbe | Feb. 27, 1934 |
| 2,844,000 | Nield | July 22, 1958 |

FOREIGN PATENTS

| | | |
|---|---|---|
| 572,155 | France | Feb. 15, 1924 |
| 1,084,419 | France | July 7, 1954 |
| 179,041 | Great Britain | May 4, 1922 |
| 588,655 | Great Britain | May 30, 1947 |
| 744,196 | Great Britain | Feb. 1, 1956 |

UNITED STATES PATENT OFFICE
CERTIFICATE OF CORRECTION

Patent No. 2,944,392                  July 12, 1960

John M. Tyler

It is hereby certified that error appears in the printed specification of the above numbered patent requiring correction and that the said Letters Patent should read as corrected below.

Column 5, line 15, strike out "or in a retracted non-operative position" and insert the same after "directed" in line 18, same column.

Signed and sealed this 27th day of December 1960.

(SEAL)
Attest:
KARL H. AXLINE

Attesting Officer

ROBERT C. WATSON
Commissioner of Patents